Feb. 9, 1943.   I. C. NOURSE   2,310,806
METHOD FOR PRODUCING TETRAETHYL LEAD
Filed Aug. 19, 1940   3 Sheets-Sheet 1
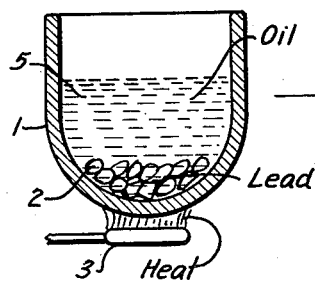
Fig. 1.
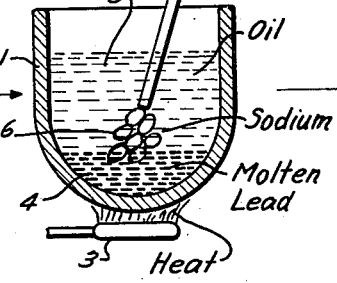
Fig. 2.
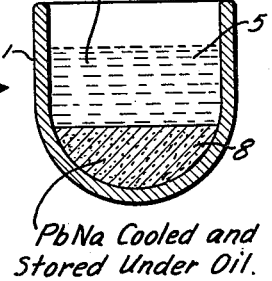
Fig. 3. PbNa Cooled and Stored Under Oil.
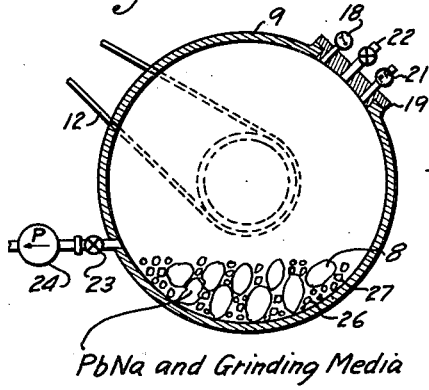
Fig. 4. PbNa and Grinding Media
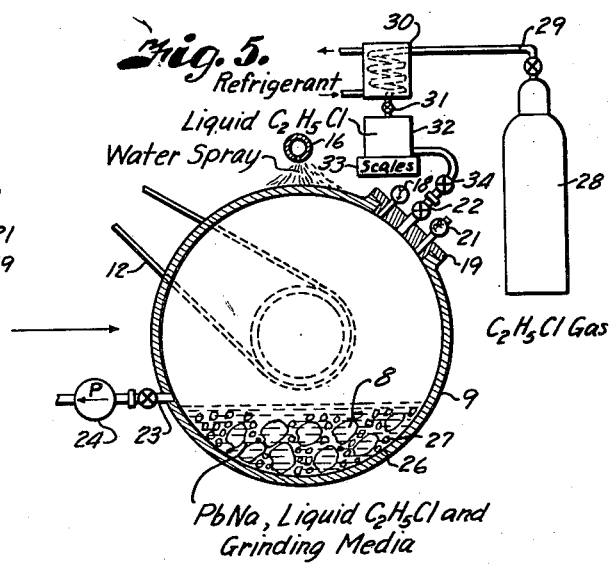
Fig. 5. PbNa, Liquid C₂H₅Cl and Grinding Media
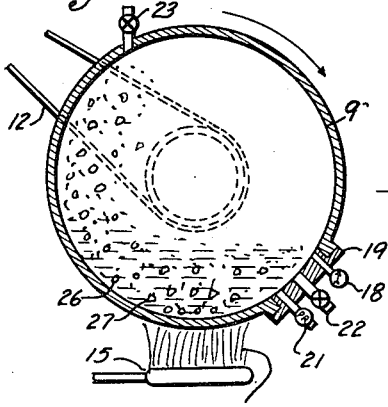
Fig. 6. If Necessary Heat To Start Reaction
Fig. 7. Hold Pressure At Desired Point By Applying Cooling Medium To Vessel For Controlling Reaction.
INVENTOR
Ira C. Nourse.
BY
ATTORNEY Feb. 9, 1943.  I. C. NOURSE  2,310,806
METHOD FOR PRODUCING TETRAETHYL LEAD
Filed Aug. 19, 1940  3 Sheets-Sheet 2
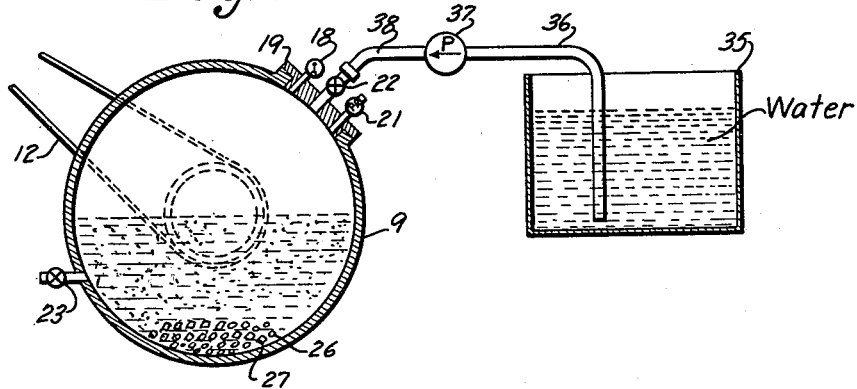
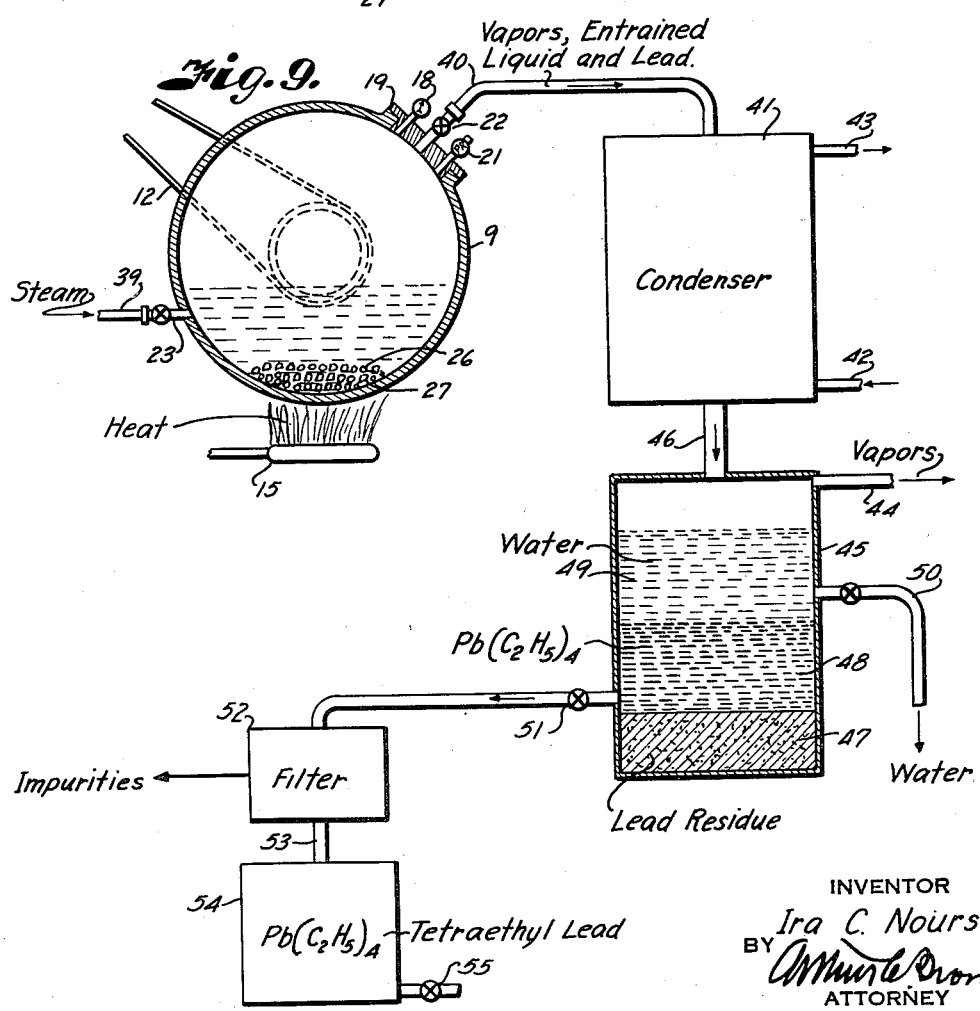
INVENTOR
Ira C. Nourse.
BY
ATTORNEY Feb. 9, 1943. I. C. NOURSE 2,310,806
METHOD FOR PRODUCING TETRAETHYL LEAD
Filed Aug. 19, 1940 3 Sheets-Sheet 3
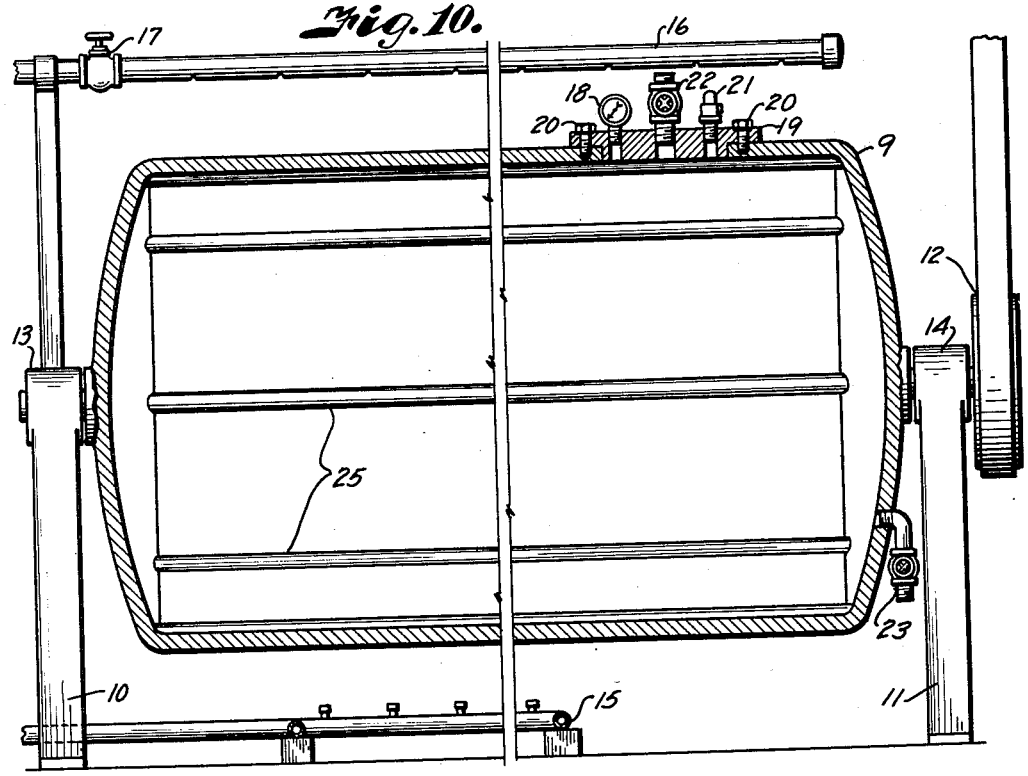
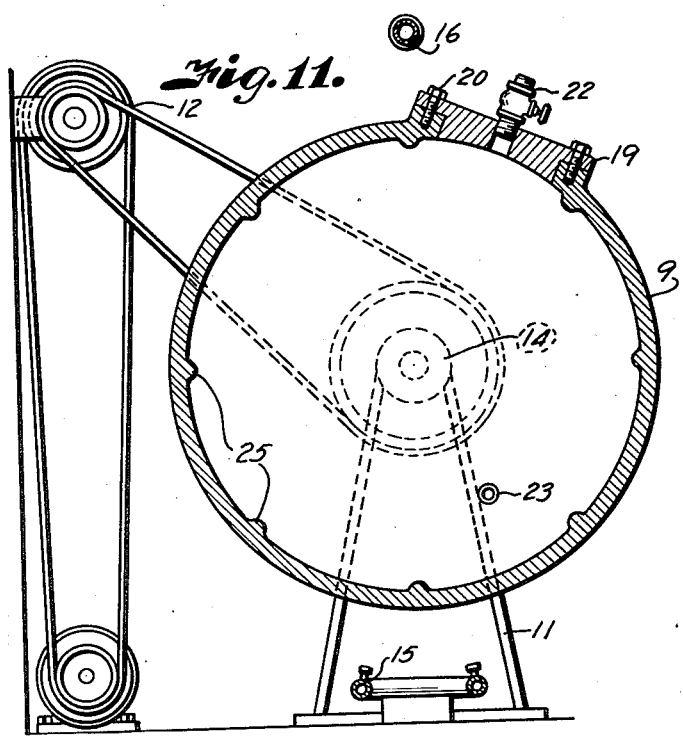
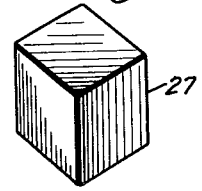
INVENTOR
Ira C. Nourse.
BY
ATTORNEY Patented Feb. 9, 1943

2,310,806

UNITED STATES PATENT OFFICE 2,310,806

METHOD FOR PRODUCING TETRAETHYL LEAD

Ira Cuppy Nourse, Tulsa, Okla.

Application August 19, 1940, Serial No. 353,174

2 Claims. (Cl. 260—437)

This invention relates to a method for producing tetraethyl lead, the principal objects of the invention being to provide a convenient, relatively economical, efficient and safe method and apparatus for that purpose.

In the production of tetraethyl lead, many difficulties are encountered, principal among which are the disposition of fumes resulting from reactions of ingredients forming the ultimate product. Such fumes are poisonous to workers with materials going into the product, and the workers must, therefore, be protected from them as fully as possible. Certain of the ingredients going into or used in the production of tetraethyl lead are difficult to handle, for example, metallic sodium, one of the present ingredients of tetraethyl lead, fires if exposed to air, and explodes if exposed to moisture, thus creating a fire hazard for workers and equipment inclusive of plants generally employed in the production of tetraethyl lead. The lead itself is difficult to render porous, a condition which is desirable, if not essential, to the production of tetraethyl lead in order to effect a saturation of the lead with ingredients producing tetraethyl lead in combination therewith. Ethyl halides, particularly in gaseous form, are also normally difficult to apply to the metallic sodium and lead in sufficient quantities to properly react therewith to produce tetraethyl lead. Present equipment and manipulations thereof are, furthermore, cumbersome, very expensive and complicated, thus rendering the cost of producing tetraethyl lead so high and the points of production are so widely spaced as to work an economical hardship on manufacturers and users of the ultimate product, tetraethyl lead.

Other objects of the invention are, therefore, to obviate the difficulties above mentioned and more particularly to exclude air and moisture from metallic sodium during treatment of lead therewith; to facilitate comminuting lead to render it porous and susceptible of saturation with hydrocarbon constituents of ethyl halides; to form an alloy that is suitable for the production of tetraethyl lead; to provide for efficiently adding a reacting agent to the alloy for efficiently producing tetraethyl lead; to provide for efficiently reacting the ingredients of the ultimate product and the separation of the product from any excesses of ingredients; and to provide improved steps in a method, as well as elements in an apparatus, together with arrangements thereof in the method and apparatus for producing tetraethyl lead.

In accomplishing these and other objects of the invention, I have provided improved steps in the method and details of structure in the apparatus, the preferred arrangement and form of which are indicatively illustrated in the accompanying drawings wherein:

Fig. 1 is a diagrammatic section through a vessel for reducing lead to a molten state.

Fig. 2 is a view similar to Fig. 1 showing the application of metallic sodium to the molten lead under the protection of a covering of oil.

Fig. 3 is a similar view showing an alloy of lead and metallic sodium in a condition for storage in a vessel which may be the same vessel in which the alloy is formed.

Fig. 4 is a diagrammatic section through a vessel suitable for comminuting the alloy illustrated in Fig. 3.

Fig. 5 is a sectional view through the vessel shown in Fig. 4 illustrating insertion of a reacting agent to the alloy.

Fig. 6 is a sectional view through the vessel shown in Figs. 4 and 5 illustrating comminuting of the alloy and mixing the reaction agent therewith.

Fig. 7 is a sectional view through the vessel shown in Fig. 6 illustrating the manner of controlling heat and pressure in the vessel.

Fig. 8 is a sectional view through the vessel illustrating equipment suitable for applying a carrier to the reaction products in the vessel.

Fig. 9 is a sectional view through the vessel diagrammatically illustrating equipment for separating tetraethyl lead from its carrier and excesses of ingredients, parts of the equipment being shown in diagrammatic section.

Fig. 10 is a detail longitudinal vertical section through the reaction vessel shown in Figs. 4 to 9, inclusive, for carrying out reactions to produce tetraethyl lead in accordance with this invention.

Fig. 11 is a vertical transverse section through the apparatus illustrated in Fig. 10.

Figs. 12 and 13 are detail perspective views respectively of grinding media suitable for comminuting an alloy to produce tetraethyl lead therefrom.

Referring more in detail to the drawings, and particularly to the method steps relative thereto:

1, Fig. 1, designates a vessel of a size, shape and material suitable for the reception of lead 2, the vessel 1 being provided with a heating element 3 for reducing the lead to a molten state as indicated at 4, Fig. 2.

In the present method, it has been found desirable to exclude air and moisture from the lead substantially immediately upon starting reduction thereof to the molten state and to this end a covering is provided for the lead which is preferably in the form of an oil layer 5, the principal requisite of which is that it have a flash point higher than the melting point of the lead. For example, the melting point of lead is approximately 350° Fahrenheit, and an oil having a flash point of approximately 750° Fahrenheit has been found suitable for the noted air and moisture excluding cover.

In order to facilitate rendering the lead of sufficient porosity to saturate the same, it has been found desirable to first produce a brittle alloy with the lead of such a character that it may be ground to approximately the fineness of face powder and thus provide a maximum surface area for facilitating reaction. Metallic sodium has been found to be miscible with the lead to produce an alloy of the character desired. Since metallic sodium fires upon exposure to air and explodes upon exposure to moisture, care is necessary in the handling of the metallic sodium. The protective oil covering for the molten lead is admirably suited for protecting the metallic sodium and allowing its mixture with the molten lead to produce the desired alloy therewith and with the minimum of danger to operators of this method and apparatus.

The oil covering also confines fumes normally issuing from the lead and/or from the mixture of lead and metallic sodium to thus further protect operators of this method and apparatus.

6, Fig. 2, designates a suitable quantity of metallic sodium that is applied to the molten lead preferably in the proportion of approximately ten percent (10%) metallic sodium to approximately ninety percent (90%) lead, while both are protected by the oil covering 5, the molten lead and metallic sodium preferably being mechanically mixed in a suitable manner, as by a stirring rod 7 or the like.

An alloy 8, Fig. 3, of lead and metallic sodium (PbNa) is produced in the vessel 1 and may be stored under oil for a reasonable length of time before use.

If desired, the oil coating or covering 5, particularly when the lead and sodium alloy has cooled, may be replaced by kerosene or the like, the advantage of which is that the kerosene is readily removed from the alloy when ready for use. The clean lead and sodium alloy may subsequently be exposed to air for reasonable periods of time, such as approximately for from 15 to 30 minutes, without firing under its own heat.

The lead after conversion into a brittle alloy is suitable for comminution as in a suitable vessel 9, Fig. 4, the details of the preferred form of which are shown in Figs. 10 and 11. Generally, the vessel 9 is preferably of cylindrical shape, horizontally arranged and rotatably mounted on suitable standards 10 and 11.

Suitable devices 12 are provided for rotating the vessel 9 in its bearings 13 and 14 on the standards 10 and 11. A suitable heating device 15 is provided for heating the vessel 9 and the contents thereof, and a suitable heat and pressure control device 16, that is preferably in the form of a water spray arranged for contact with the vessel, is provided therefor. The water spray may be controlled by a valve 17 in relation to pressures in the vessel indicated by a gauge 18 that may be mounted in a manhole cover 19 that is suitably secured in covering relation to the principal inlet to the vessel 9, as by fastening devices 20. A pressure relief valve 21 may also be provided in the manhole cover 19 as a precautionary measure, and a valved fluid inlet and outlet 22 is preferably also arranged in the manhole cover 19, substantially as illustrated. The vessel 9 is also preferably provided with a valved fluid inlet and outlet connection 23 by which air and moisture may be evacuated from the vessel, as by a pump 24, and by which steam or the like may be admitted to the interior of the vessel under pressure. The interior of the vessel is preferably provided with spaced parallel longitudinally arranged ribs 25 that are suitable for effecting tumbling of the contents of the vessel upon rotation of the vessel.

Grinding media, such as balls 26, Fig. 12, and blocks 27, Fig. 13, of suitable size and material are preferably applied to the dry interior of the vessel 9 through the manhole therein and evacuation of the vessel of air may be commenced. The lead and metallic sodium alloy may then be suitably broken preferably into "chunks" which may be applied to the interior of the vessel 9, whereupon the vessel 9 is closed by the manhole cover 19 before sufficient time has elapsed for the alloy to fire under its own heat, continued evacuation of air and moisture from the vessel reducing the possibility of firing of the alloy. When a substantially complete vacuum is produced in the vessel 9, the pump 24 may be disconnected therefrom.

The alloy is then ready for application thereto of a reacting agent which is preferably in the form of a commercially available ethyl halide, such as ethyl chloride, ($C_2H_5Cl$). Ethyl chloride is normally a gas, the volume of which may be reduced approximately six-hundred (600) times by liquefaction to thus facilitate its controlled application to the alloy. In effecting such an application a container 28, Fig. 3, of gaseous ethyl chloride may be and preferably is connected by a valved connection 29 leading to refrigerating coils 30 which upon reduction of the gas temperature to approximately 60° Fahrenheit converts the gas to a liquid. A valved connection 31 may be provided the refrigerating coils 30 to communicate the same with a container 32 for the liquid ethyl chloride which may be weighed or otherwise suitably measured, as by scales 33 or the like, to desirable quantities thereof. The preferable proportion is approximately one and one-half (1½) gallons of liquid ethyl chloride to fifty (50) pounds of alloy in the vessel 9 and the ethyl chloride may be applied to the vessel 9 as by a valved connection 34, the vacuum in the vessel 9 providing a convenient and efficient manner of drawing the liquid ethyl chloride into the vessel 9. Air and moisture obviously are excluded during application of the liquid ethyl chloride to the vessel 9.

Upon application of the liquid ethyl chloride to the vessel 9 and alloy, the valved connection with the supply of ethyl chloride is separated from the vessel and the vessel or mill 9 is then rotated to grind the alloy. Sufficient heat is usually created by the grinding action in the time required for reducing the alloy to a powdered state to start reaction between the lead-sodium alloy and the ethyl chloride. Where temperatures exteriorly of the vessel are low, additional heat may be applied to the vessel by the heating element 15.

A chemical reaction between the chloride of the ethyl chloride and the sodium of the lead and sodium alloy, and also reactions between the hydrocarbon constituents of the ethyl chloride and the lead of the lead and sodium alloy, raise the temperature in the vessel to such an extent that liquid ethyl chloride is reconverted into a gas.

As the liquid ethyl chloride is reconverted into a gaseous state, its volume tends to increase back to its original volume of approximately six hundred (600) times its liquid volume, and pressures of considerable moment are produced in the vessel 9. The temperature, pressure and speed of reaction in the vessel may be controlled by manipulating the valved control element 16 to apply the water spray to the exterior of the vessel 9 to thus control the temperature and also the pressure in the vessel 9. Good results have been attained by holding the pressure in the vessel at approximately one hundred (100) pounds per square inch.

After the reactions between the ethyl chloride and lead-sodium alloy have been completed, a suitable quantity of water is applied to the mixture in the vessel 9 for use as a carrying agent as later described. Such water may be applied from a source such as a vessel 35, Fig. 8, that is provided with a line 36 acted upon by a pump 37, a line 38 of which may be connected with the valved inlet and outlet connection 22 of the vessel water preferably being supplied in the proportion of approximately from six (6) to ten (10) gallons of water to one (1) gallon of tetraethyl lead so produced, depending upon the temperature in the condensing coils later described.

While tetraethyl lead is produced by reactions in the vessel 9, it has been found desirable, in order to remove the tetraethyl lead and excesses of ingredients from the vessel, to heat the contents of the vessel and carry the contents from the vessel by the water vapor acting as a carrying agent. The water vapor is then preferably condensed outside the vessel 9.

Heat from element 15 is thus preferably applied to the vessel 9 to distill the contents of the vessel 9 and steam is applied to the vessel through the connection 23 under preferably approximately from fifteen (15) to twenty (20) pounds pressure per square inch through a steam line 39 therefor in order to agitate the contents of the vessel 9 and form a carrier for transferring the contents of the vessel 9 from the vessel through a line 40 that may be connected at one end with the inlet and outlet 22 of the vessel 9, and at its other end to a condenser 41 that may be provided with suitable refrigerant inlet and outlet line 42 and 43.

The contents of the vessel 9 are carried over into the condenser as vapors, entrained liquid and lead and as soon as the contents in such states are condensed, the undesirable vapors or gases may be exhausted from the said contents through a line 44 leading to a suitable point of disposition from a receiving vessel 45 for the condensation products, which vessel 45 may be connected with the condenser 41, as by a line 46.

The excess of lead is carried from the vessel 9 to the condenser in droplets associated with the vapors, water and tetraethyl lead, which excess of lead gravitates to the bottom of the vessel 45 and collects therein, as indicated at 47.

The tetraethyl lead and water stratify by gravitation, as indicated at 48 and 49, whereupon the water may be drawn off or otherwise disposed of, as by a valved outlet 50 from the vessel 45 that may lead to a suitable point of disposal for the water.

The tetraethyl lead separated from the vapors, water and lead, and forming the ultimate product produced by this method and apparatus may then be drawn off from the vessel 45, as by a valved connection 51 which may lead to a suitable storage receptacle or other point for disposition of the tetraethyl lead so produced.

As a matter of practice, it is sometimes desirable to purify the tetraethyl lead, which purification may be accomplished by passing the tetraethyl lead from the vessel 45 through a filter 52, the filter separating impurities out of the tetraethyl lead and providing for collection of the purified tetraethyl lead through a line 53 from the filter leading to a container 54 for the tetraethyl lead, which may be provided with a valved outlet 55 to facilitate collection of controlled amounts of the final product—purified tetraethyl lead.

It has been found that in carrying out the present process, tetraethyl lead may be separated after the condensation step from vapors, water and lead residue in the approximate proportion of one (1) gallon tetraethyl lead to ten (10) gallons of water, and that the excesses of lead present in the condensation products may be recovered in the proportion of approximately ninety-five percent (95%) of the original lead content, this lead being reuseable.

It has been found that tetraethyl lead produced in accordance with this method and by this apparatus has the same purity as tetraetyl lead at present commercially available.

It is apparent, therefore, that my invention produces a relatively stable motor fuel treating agent; that the steps of the method and operation of the apparatus eliminate fume hazard normally encountered in such processes; that the apparatus withstands reactions while the same are being carried out; and that a convenient, relatively economical, efficient and safe method and apparatus for producing tetraethyl lead is provided.

What I claim and desire to secure by Letters Patent is:

1. The method of producing tetraethyl lead including, placing a lead sodium alloy in an enclosed reaction chamber, drawing a sufficient vacuum in said chamber to remove air and moisture therefrom, measuring the required amount of a liquefied ethyl halide, introducing the ethyl halide into the chamber with the aid of said vacuum, comminuating the alloy in said chamber, effecting reaction of the ethyl halide with the reduced alloy by agitation, and controlling the reaction temperature to hold the autogenous pressure within the chamber to approximately one hundred pounds per square inch.

2. The method of producting tetraethyl lead including, placing a lead sodium alloy and a grinding medium in an enclosed reaction chamber, drawing a sufficient vacuum in said chamber to remove air and moisture therefrom, liquefying an ethyl halide and measuring an amount sufficient to react with the alloy, introducing the ethyl halide into the chamber with the aid of said vacuum, agitating the contents of the reaction chamber to effect reduction of the alloy by said grinding medium and reaction of the ethyl halide with the reduced alloy, and controlling the reaction temperature and the consequent autogenous pressure by the application of a cooling medium to said chamber.

IRA CUPPY NOURSE.